US011294859B2

(12) United States Patent
Helvik et al.

(10) Patent No.: US 11,294,859 B2
(45) Date of Patent: Apr. 5, 2022

(54) FILE USAGE RECORDER PROGRAM FOR CLASSIFYING FILES INTO USAGE STATES

(71) Applicant: Microsoft Technology Licensing, LLC, Redmond, WA (US)

(72) Inventors: Torbjorn Helvik, Oslo (NO); Vegar S. Wang, Tromso (NO); Jan Heier Johansen, Tromso (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 16/743,942

(22) Filed: Jan. 15, 2020

(65) Prior Publication Data

US 2021/0216499 A1 Jul. 15, 2021

(51) Int. Cl.
*G06F 16/00* (2019.01)
*G06F 16/13* (2019.01)
*G06F 16/14* (2019.01)
*G06F 16/17* (2019.01)

(52) U.S. Cl.
CPC ............ *G06F 16/13* (2019.01); *G06F 16/148* (2019.01); *G06F 16/1734* (2019.01)

(58) Field of Classification Search
CPC .......................... G06F 16/148; G06F 16/1734
USPC ................................................. 707/740, 711
See application file for complete search history.

(56) References Cited

U.S. PATENT DOCUMENTS

| 9,965,204 | B1* | 5/2018 | Cousins | G06F 11/1092 |
| | | | | 707/707 |
| 2005/0246382 | A1* | 11/2005 | Edwards | G06F 16/13 |
| | | | | 707/707 |
| 2007/0180001 | A1* | 8/2007 | Akelbein | G06F 16/13 |
| | | | | 707/707 |
| 2007/0198364 | A1 | 8/2007 | Quoc et al. | |
| 2008/0243835 | A1* | 10/2008 | Suzuki | G06F 16/951 |
| | | | | 707/707 |
| 2012/0005237 | A1* | 1/2012 | Obata | H04L 67/1085 |
| | | | | 707/798 |
| 2014/0310317 | A1* | 10/2014 | Spillane | G06F 16/9027 |
| | | | | 707/803 |

OTHER PUBLICATIONS

"International Search Report and Written Opinion Issued in PCT Application No. PCT/US2020/064141", dated Mar. 3, 2021, 11 Pages.

* cited by examiner

*Primary Examiner* — Alexandria Y Bromell (57) ABSTRACT

A file usage recorder program that is executed on a processor is disclosed. The file usage recorder program may be configured to determine usage data for a plurality of files stored in a file system. The usage data may include, for each file, a plurality of usage instances by one or more users. The file usage recorder program may further be configured to classify each of the plurality of files as being in one of a plurality of predetermined usage states, based on the determined usage data. The file usage recorder program may further be configured to generate a usage index indicating the usage state of each of the plurality of files, and output the usage index for use by a software program.

20 Claims, 9 Drawing Sheets

FILE USAGE RECORDER PROGRAM FOR CLASSIFYING FILES INTO USAGE STATES

BACKGROUND

Computer file systems may reside locally on an individual user's computing device or on a networked server system that is accessible to many users via respective client computing devices. File systems that are accessible over a network, such as the Internet, enable sharing and collaboration among multiple users. Application programs for creating and editing files within a networked file system may provide advanced collaboration features, including versioning that produces many file instances of a source document. As file systems grow in size and complexity, particularly within collaborative environments, users may face challenges in searching for and identifying relevant files. For example, a user's search query for a file that uses a file name or last modified date as a search query term can produce long lists of matching files within search results that are so voluminous as to be difficult for the user locate a particular file or may contain results that are not relevant to the user.

SUMMARY

Examples are disclosed of a computing system which includes a processor for executing a file usage recorder program. The file usage recorder program may be configured to determine usage data for a plurality of files stored in a file system. The usage data may include, for each file, a plurality of usage instances by one or more users. The file usage recorder program may further be configured to classify each of the plurality of files as being in one of a plurality of predetermined usage states, based on the determined usage data. The file usage recorder program may further be configured to generate a usage index indicating the predetermined usage state for each of the plurality of files, and output the usage index for use by a software program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Users face challenges when searching for and identifying relevant files stored in a file system. For example, a user's search query for a file that uses a file name or last modified date as a search query term can produce long lists of matching files within search results that are so voluminous as to be difficult for the user to locate a particular file or may contain results that are not relevant to the user. To address these and other challenges, a file usage recorder program is disclosed that generates a usage index indicating a predetermined usage state for each of a plurality of files of a file system. Each predetermined usage state may be defined to represent a portion or phase of a file's life cycle or the entire life cycle of the file on the file system. A usage state that represents the entire life cycle of a file may be referred to as a life cycle state, which represents just one of the many examples of predetermined usage states disclosed herein.

The predetermined usage state for each file is based on usage data determined by the file usage recorder program for the plurality of files. The usage data for each file includes a plurality of usage instances by one or more users with respect to the file, such as creating, reading, writing, editing, deleting, copying, sharing, presenting, etc. File usage data may include a rich collection of information, including data gathered from tracking and recording the life cycle of each file over time. The usage index may be used by a software program (e.g., a search engine) to identify and output an ordered list of files of the file system in which a relevancy of each file is based, at least in part, on the predetermined usage state associated with each file in the file system. This approach enables users to search for files that exhibit a particular predetermined usage state that represents how and the extent to which users have interacted with those files over each file's life cycle or a portion thereof.

Figure 1:
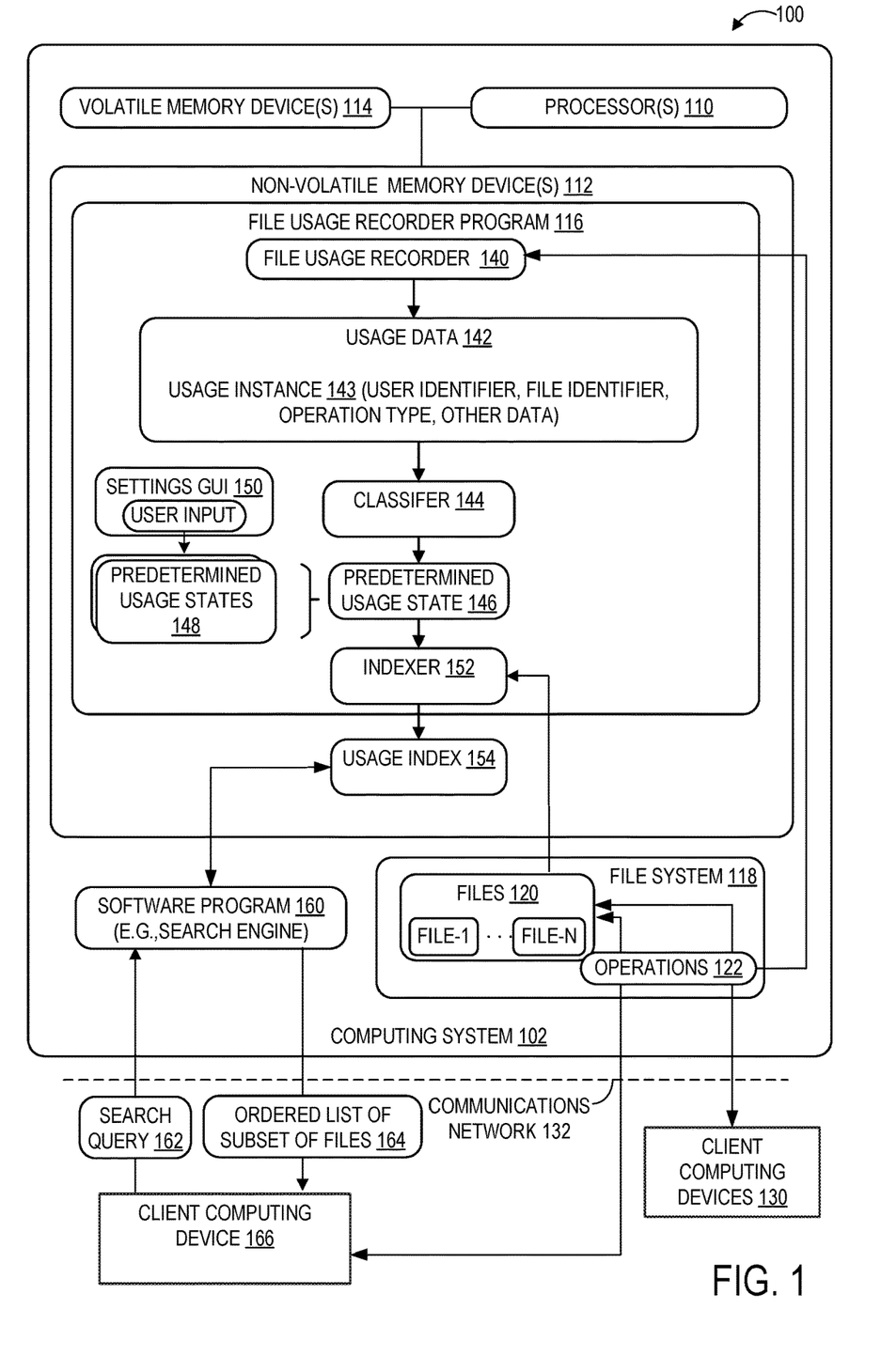
FIG. 1 shows a schematic view of a first example configuration of a system for executing a file usage recorder program.

FIG. 1 shows a schematic view of a first example configuration of a system 100 for executing a file usage recorder program. System 100 includes a computing system 102 of one or more computing devices. Computing system 102 includes one or more processors 110 that are configured to execute instructions stored in one or more memory devices of the computing system to perform a set of operations or methods. Examples of memory devices include one or more non-volatile memory devices 112, and one or more volatile memory devices 114. An example of instructions executable by the one or more processors 110 is depicted in FIG. 1 as file usage recorder program 116 stored in the one or more non-volatile memory devices 112. Alternatively or additionally, file usage recorder program 116 may be stored in the one or more volatile memory devices 114. Accordingly, the one or more processors 110 may access and execute file usage recorder program 116 using any suitable combination of non-volatile and/or volatile memory devices 112 and 114.

Computing system 102 includes a file system 118 containing a plurality of files 120 (e.g., File-1 through File-N).

File system 118 may be stored in one or more memory devices, such as the one or more non-volatile memory devices 112 and/or the one or more volatile memory devices 114. Operations 122 may be performed on one or more of the files of file system 118 by a plurality of users operating client computing devices 130. In this example, client computing devices 130 interact with computing system 102 via a communications network 132. Operations 122 may include creating a file, reading a file, writing to a file, editing a file, deleting a file, copying a file, sharing a file, and presenting a file.

Computing system 102, upon execution of file usage recorder program 116 by the one or more processors 110, is configured to instantiate a file usage recorder 140 that receives an indication of operations 122 that are performed with respect to files 120 of file system 118. In an example, file usage recorder 140 receives the indication of operations 122 performed by users with respect to files 120 from file system 118. File usage recorder 140 determines usage data 142 for the plurality of files 120 stored in file system 118 based on operations 122. For each file, the usage data includes one or more usage instances by one or more users, as described in further detail herein with reference to FIG. 2. An example usage instance 143 includes a user identifier that identifies a respective user attributed to the operation, a file identifier that identifies a respective file to which the operation was performed, an associated operation type selected from a plurality of predetermined operation types, a timestamp of the operation, and other data. Examples of the information that may be recorded with respect to each usage instance are described in further detail with reference to FIG. 2.

In the example of operation types, such as sharing or presenting a file, the user identifier that performed (e.g., initiated) the operation type may be included in the usage instance data. Additionally, user identifiers of other users with whom the file was shared or presented may be included in the usage instance data to associate those users with the usage instance. In at least some examples, the user identifier of the user that performed the operation may be distinguished from the other user identifiers associated with the operation type (e.g., users with whom the file was shared or presented) by an identifier or field type within the usage instance data, thereby enabling users associated with a particular operation type to be identified and counted. It will be understood that the sharing or presenting of files 120 stored in file system 118 may utilize a third-party application program (e.g., a collaboration program) and/or communications service (e.g., email) that is external to the file system and/or file usage recorder program 116. In this example, file usage recorder 140 or another component of file usage recorder program 116 may interface with the third-party application program and/or communications service via an application programming interface (API) to obtain usage data relating to file-related operations, such as sharing or presenting of files 120.

Computing system 102, upon execution of file usage recorder program 116, is configured to instantiate a classifier 144 that classifies each file of the plurality of files 120 of file system 118 as being in a predetermined usage state 146 of a plurality of predetermined usage states 148, based on usage data 142 determined for the plurality of files. Each of the plurality of predetermined usage states 148 may indicate a frequency and/or quantity of usage instances by one or more users. In an example, each of the plurality of predetermined usage states 148 may be defined by user input received via a settings graphical user interface (GUI) 150 of file usage recorder program 116. An example of settings GUI 150 is described in further detail with reference to FIG. 5.

Computing system 102, upon execution of file usage recorder program 116, is configured to instantiate an indexer 152 that generates a usage index 154 indicating, for each file of the plurality of files 120, the predetermined usage state (e.g., 146) in which the file was classified, and output the usage index for use by a software program 160. In at least some examples, usage index 154 may form part of a search index that includes other index information (e.g., properties) relating to the plurality of files of the file system.

In an example, software program 160 includes a search engine. In this example, computing system 102, upon execution of software program 160 is further configured to receive a search query 162 (e.g., from a client computing device 166 operated by a user) containing one or more search query terms, identify a subset of files of the plurality of files 120 in usage index 154 that match the search query based on the one or more search query terms, determine a relevancy of each file of the subset of files based, at least in part, on the predetermined usage state (e.g., 146) associated with each file of the subset of files, generate an ordered list 164 of the subset of files, and output the ordered list. An order of the subset of files in ordered list 164 is based on the relevancy determined for each file in the ordered list.

Figure 2:
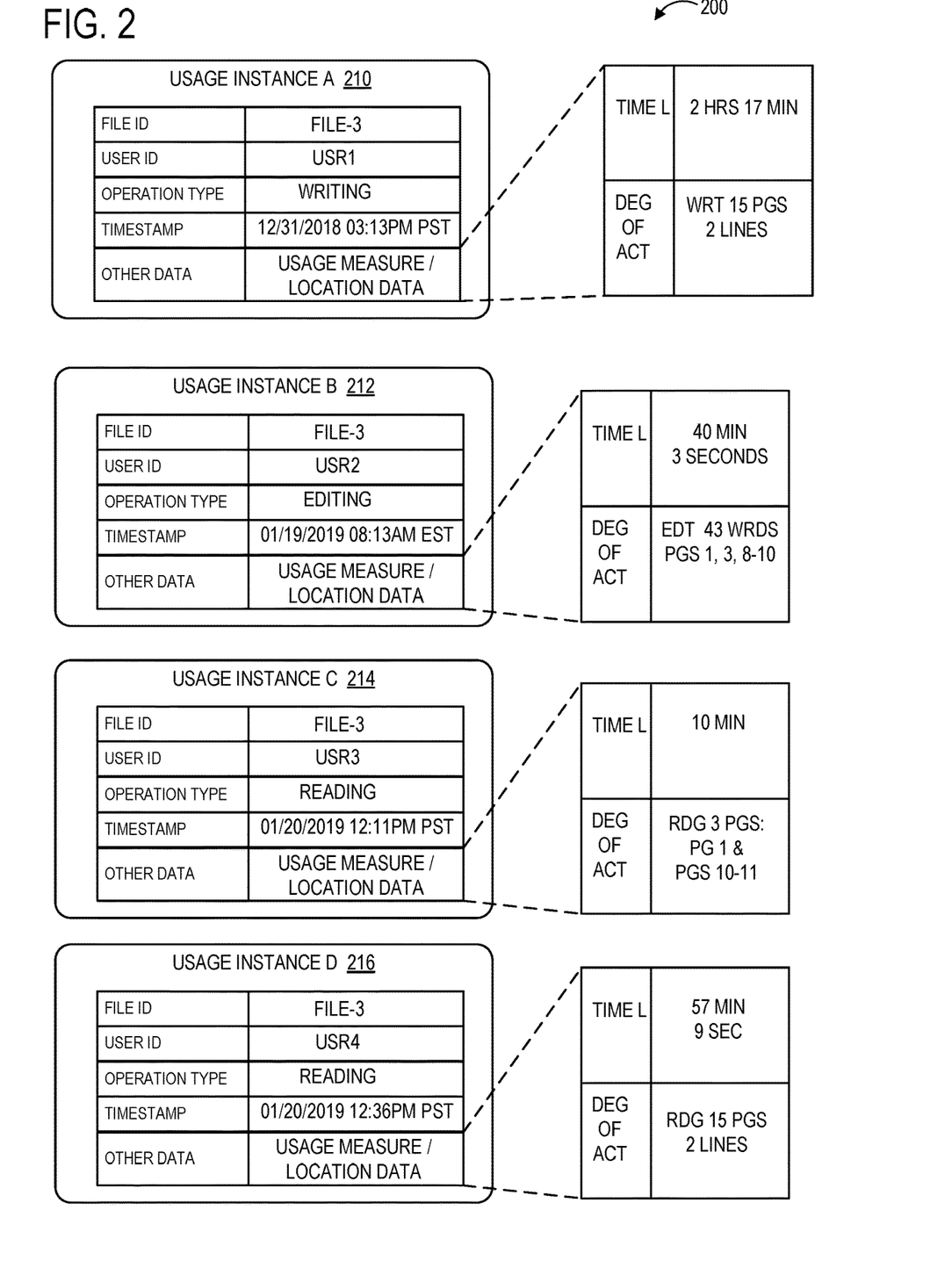
FIG. 2 shows a schematic view of a plurality of usage instances recorded by the file usage recorder program of the system of FIG. 1.

FIG. 2 shows a schematic view of a plurality of example usage instances 200 recorded by execution of file usage recorder program 116 of FIG. 1. Usage instances 200 are examples of usage instance 143 of FIG. 1. "USAGE INSTANCE A" 210, "USAGE INSTANCE B" 212, "USAGE INSTANCE C" 214, and "USAGE INSTANCE D" 216 are depicted in FIG. 2 as examples of usage instances 200. These usage instances include example values corresponding to various usage information that can be stored or recorded for a file. Here, variable names used to reference the stored values in a typical usage instance include: "FILE ID", "USER ID", "OPERATION TYPE", "TIMESTAMP", and "OTHER DATA". As illustrated here, each usage instance identifies a respective user in the variable name "USER ID", that may be referred to with a key value such as "USR1" "USR2" "USR3" and "USR4." As also depicted here, each usage instance identifies a corresponding file in the variable name "FILE ID", such as "FILE-3."

In some collaborative scenarios, multiple users may work on or interact with the same file (e.g., "FILE-3"). Each usage instance may also include a stored or recorded value for an associated operation type selected from a plurality of predetermined operation types. For example, within the variable name "OPERATION TYPE", a value identifying the operation type performed by the user may include reading a file, writing to a file, editing a file, deleting a file, copying a file, creating a file, sharing a file, and/or presenting a file. For any corresponding file, there may be one or more usage instances.

In this example, "USAGE INSTANCE C" 214 and USAGE INSTANCE D" 216 are associated with operation types in the variable name "OPERATION TYPE" that references the same value: "READING." Multiple usage instances for a corresponding file may provide aggregated information about the usage history of a file, such that a life cycle of a file may be determined. For example, the life cycle of a file may begin when the file is created, and may be followed by writing to the file. A usage instance may also include, for each respective file, a timestamp when the operation type was initiated or concluded. For "USAGE INSTANCE A" 210, the variable "TIMESTAMP" records a value that indicates when a user, such as "USR1", initiated or concluded their interaction (e.g., a writing operation type) with "FILE-3," for example. As depicted in FIG. 2, the variable "TIMESTAMP" may include a date in combination with a time of day for each usage instance.

Also, in FIG. 2, "OTHER DATA" of each usage instance includes one or more additional variable names where one or more values can be recorded for identifying a usage measure and/or geographic data associated with the usage instance. A usage measure may include one or more values for the following: a measure of time (e.g., a length of time or time lapse) over which the operation type was performed, a measure of an amount of content to which the operation type was performed (e.g., a quantity or data size of text characters, words, lines, paragraphs, pages, slides, video frames, comments, tags, media content items), specific portions of content within the file to which the operation type was performed (e.g., a paragraph number, a page, slide or frame number, a media content identifier, a playback time range of a media content item), or other suitable data. An example of location data that may be collected with respect to a usage instance includes a geographic location of the user identified by the "USER ID" at the time the operation type was performed by the user. Geographic location may be in reference to geographic coordinates (e.g., as determined by GPS) or a wireless access point by which the user obtained network connectivity. Location data may additionally or alternatively identify a level, position, or group of the user identified by the "USER ID" is a member within a hierarchy or other structure of an organization.

For any corresponding file, such as "FILE-3," information recorded from a combination of multiple usage instances may be analyzed and used to derive information about the corresponding file. For example, for "FILE-3," the derived information may indicate how many users collaborated with respect to the file and during which particular timeframe those interactions occurred. In the examples depicted in FIG. 2, four users actively collaborated on "FILE-3" from Dec. 31, 2018 through Jan. 20, 2019 by a variety of operation types, including writing, editing, and reading. Maintaining a rich history of usage instances may help generate a better understanding of how the file was interacted with by users.

Figure 3:
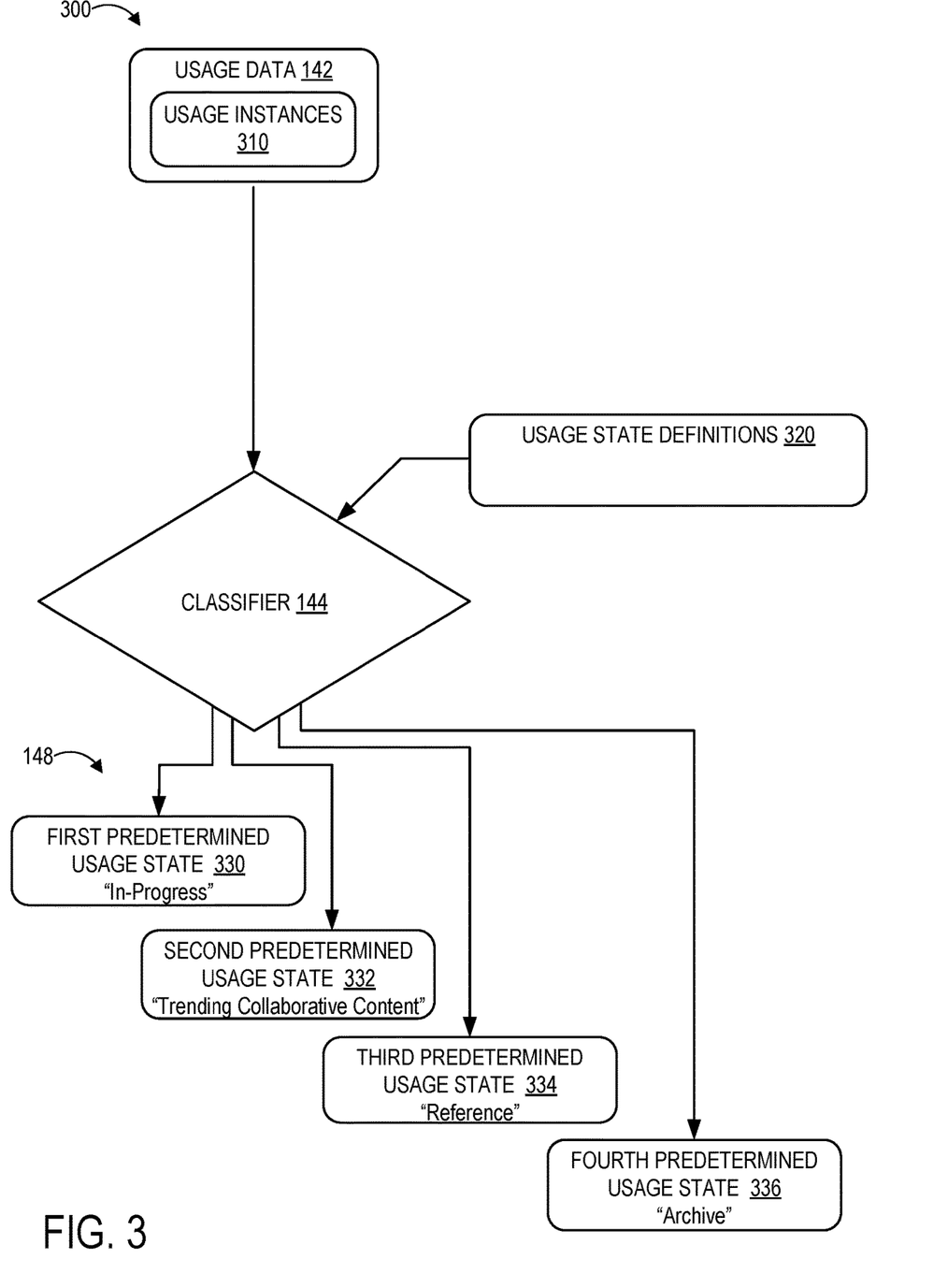
FIG. 3 shows a schematic view of the classifier of the system of FIG. 1 performing classification of a file into one of a plurality of predetermined states.

FIG. 3 shows a schematic view 300 of classifier 144 of file usage recorder program 116 of FIG. 1 performing classification of a file into one of the plurality of predetermined usage states 148 based on usage data 142. In this example, usage data 142 includes a plurality of usage instances 310 that were determined for the file. Classifier 144 classifies the file into a particular predetermined usage state of the plurality of predetermined usage states 148 based on usage data 142 using criteria defined by usage state definitions 320. An example of usage state definitions 320 is described in further detail with reference to FIG. 4.

In the example depicted in FIG. 3, the plurality of predetermined usage states 148 include four predetermined usage states 330, 332, 334, and 336. However, any suitable quantity of predetermined usage states may be used. According to an example configuration of predetermined usage states, a first predetermined usage state 330 may be referred to as an "In-Progress" usage state that is defined to capture files that have recently been edited or written to by a threshold quantity of usage instances. The "In-Progress" usage state may refer to content that is still being developed by users, and is not necessarily ready for consumption by a wider set of users. A second predetermined usage state 332 may be referred to as a "Trending Collaborative Content" usage state that is defined to capture files that have been recently edited, written to, or read by a threshold quantity of usage instances. In contrast to the "In-Progress" usage state, the "Trending Collaborative Content" usage state may refer to content that is being consumed by a wider set of users as indicated by read operations with some feedback being provided by commenting (e.g., writing) and/or editing operations. A third predetermined usage state 334 may be referred to as a "Reference" usage state that is defined to capture files that have not been recently edited or written to by a threshold quantity of usage instances, but have been recently accessed by a threshold quantity of usage instances. A fourth predetermined usage state 336 may be referred to as an "Archive" usage state that is defined to capture files that have not been recently edited, written to, or read by a threshold quantity of usage instances.

In at least some examples, classifier 144 or other component of file usage recorder program 116 may utilize a model (e.g., a machine learning model) to initially define and/or adjust usage state definitions 320 based on a set of usage data (e.g., usage data 142) to define the plurality of predetermined usage states 148. A machine learning model may be initially trained using a training set of usage data prior to deployment with respect to a file system. Arbitrary complex models, including models created through machine learning (e.g., a decision tree) may be developed. Such models can use the frequency and/or quantity of each type of operation performed on a file, as well as other suitable forms of usage data. As one example, a model can use information such as identities of the users that are interacting with a file to determine whether the users are members of the same organizational group or from different organizational groups. In this example, the file usage recorder program may reference additional databases that define organizational groups with respect to a plurality of users. As another example, for operations such as sharing and presenting a file, a model can use information such as a quantity of users with which the file was shared or presented as part of the operation.

Figure 4:
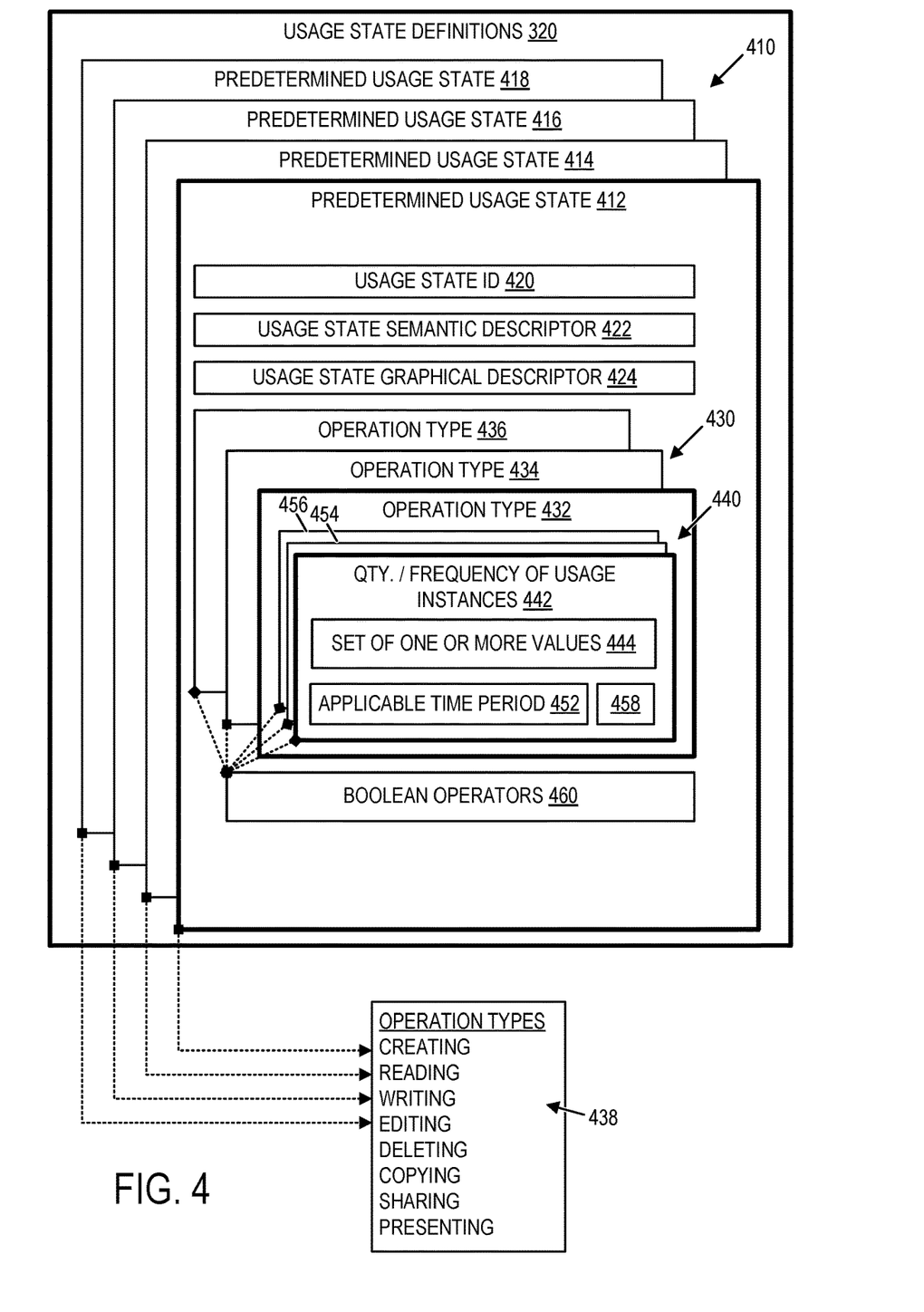
FIG. 4 shows a schematic view of usage state definitions that may be used by the classifier of file usage recorder program of FIG. 1 to classify files into a predetermined usage state.

FIG. 4 shows a schematic view of usage state definitions 320 that may be used by classifier 144 of file usage recorder program 116 to classify files into a predetermined usage state. In this example, usage state definitions 320 define a plurality of predetermined usage states 410, which in this example includes four usage states 412, 414, 416, and 418. However, any suitable quantity of usage states may be defined within usage state definitions 320 in other examples.

Each of the plurality of predetermined usage states 410 includes a respective set of definitions, an example of which is described in further detail with reference to predetermined usage state 412. In this example, usage state 412 includes an associated usage state identifier 420, usage state semantic descriptor 422 (e.g., a common, human-readable name), and usage state graphical descriptor 424 (e.g., a graphical icon). Usage state 412 further includes a set of one or more operation types 430 for which criteria may be defined. In this example, the set of operation types 430 includes three operation types 432, 434, and 436. However, any suitable quantity of operation types may be associated with a predetermined usage state. As depicted at 438, examples of operation types include creating a file, reading a file, writing to a file, editing a file, deleting a file, copying a file, sharing a file, and presenting a file.

Each operation type of the set of operation types 430 includes respective criteria 440, an example of which is described in further detail with reference to operation type 432. In this example, a first set 442 of criteria 440 includes a quantity or a frequency of usage instances that include operation type 432. The quantity or frequency of usage instances may represent a set of one or more values 444 for the quantity or frequency of usage instances. The set of values 444 may include an individual discrete value or a respective range of values that are predetermined, dynamically determined, or user specified. A range of values, in an example, is defined by a lower bound value (e.g., a frequency or quantity having a value greater than "X"), an upper bound value (e.g., a frequency or quantity having a value less than "Y"), or a combination of a lower bound value and an upper bound value (e.g., a frequency or quantity having a value between "X" and "Y").

The first set 442 of criteria 440 may further include an applicable time period 452, which defines a period of time within which the quantity or frequency of usage instances are applicable to classification by the classifier. Applicable time period 452 may define a range of time, such as the past year, the past month, between a certain date range (e.g., including the years 2018 and 2019), or between a certain date and/or time range (e.g., 9 am-5 pm on business days), as examples. In some examples, applicable time period 452 may be omitted or may define the entire time domain (e.g., the entire life cycle) of available usage data, thereby including all usage instances of operation type 432 within the available usage data regardless of timing of the usage instance. Thus, by not limiting time period 452 to less than the entire time domain of available usage data for a file, predetermined usage state 412 corresponds to a life cycle state of the file for operation type 432.

Criteria 440 of an operation type, such as example operation type 432 may include multiple sets of criteria (442, 454, 456, etc.) that define a different quantity or frequency of usage instances. For example, the first set 442 of criteria 440 may include a first range of a quantity of usage instances and a second set 454 of criteria 440 may include a second range of a frequency of usage instances. In at least some examples, each set of criteria 440 may include a counting instruction 458 that defines whether usage instances are counted on a unique user basis or on a total count basis. In the case of a unique user basis, usage instances of an operation type (e.g., operation type 432) are counted with respect to unique users that are associated with the operation type to thereby exclude counting multiple usage instances of the operation type associated with the same user. In the case of a total count basis, usage instances of the operation type are counted with respect to all users associated with the operation type, and without regard to the identity of the users. For example, according to a unique user basis, in the case of a sharing operation or a presenting operation, a count of the unique users that were shared or presented with the file may be counted as usage instances.

Beyond the above examples of criteria 440 applied to particular operation types, criteria 440 may be defined with respect to particular locations as identified by location data and/or with respect to usage measures within the "OTHER DATA" variable previously described with reference to FIG. 2. As an example, criteria 440 may be defined to include instances of an operation type that have a duration of time or involving a particular quantity of words, pages, etc. that is within a particular range of values (e.g., as identified within values 444). As another example, criteria 440 may be defined to include an operation type performed by users within a particular geographic region or within a particular organizational group. Counting instruction 458 may be used to define additional criteria beyond unique user basis vs. total count basis, such as counting or not counting users that are part of a particular organizational group (e.g., team, project, division, company) that are associated with an operation type. For example, a total count of all users of a particular group associated with an edit, share, or presentation operation type may be counted as usage instances, whereas usage instances associated with users of other organizational groups may not be counted.

Each predetermined usage state, such as example usage state 412, may include a set of Boolean operators 460 that are applied by the classifier to any combination of operation type (e.g. operation types 432, 434, 436) and their respective criteria 440, including respective sets (e.g., 442, 454, 456) of criteria 440 of an operation type. Examples of Boolean operators include: AND, OR, NOT. In an example, operation type 432 refers to editing a file and operation type 434 refers to reading the file, and both operation types 432 and 434 include respective criteria that includes a quantity of usage instances of that operation type among unique users that is within the top 5% of usage instances among files of the file system that also include editing or reading operation types. Continuing with this example, Boolean operators 460 may include an OR operator joining the criteria of operation type 432 and operation type 434, thereby directing the classifier to classify a file as being in predetermined usage state 412 if the criteria of either operation type is satisfied. The various features of usage state definitions 320 enable a vast assortment of predetermined usage states to be defined and implemented by a classifier.

Figure 5:
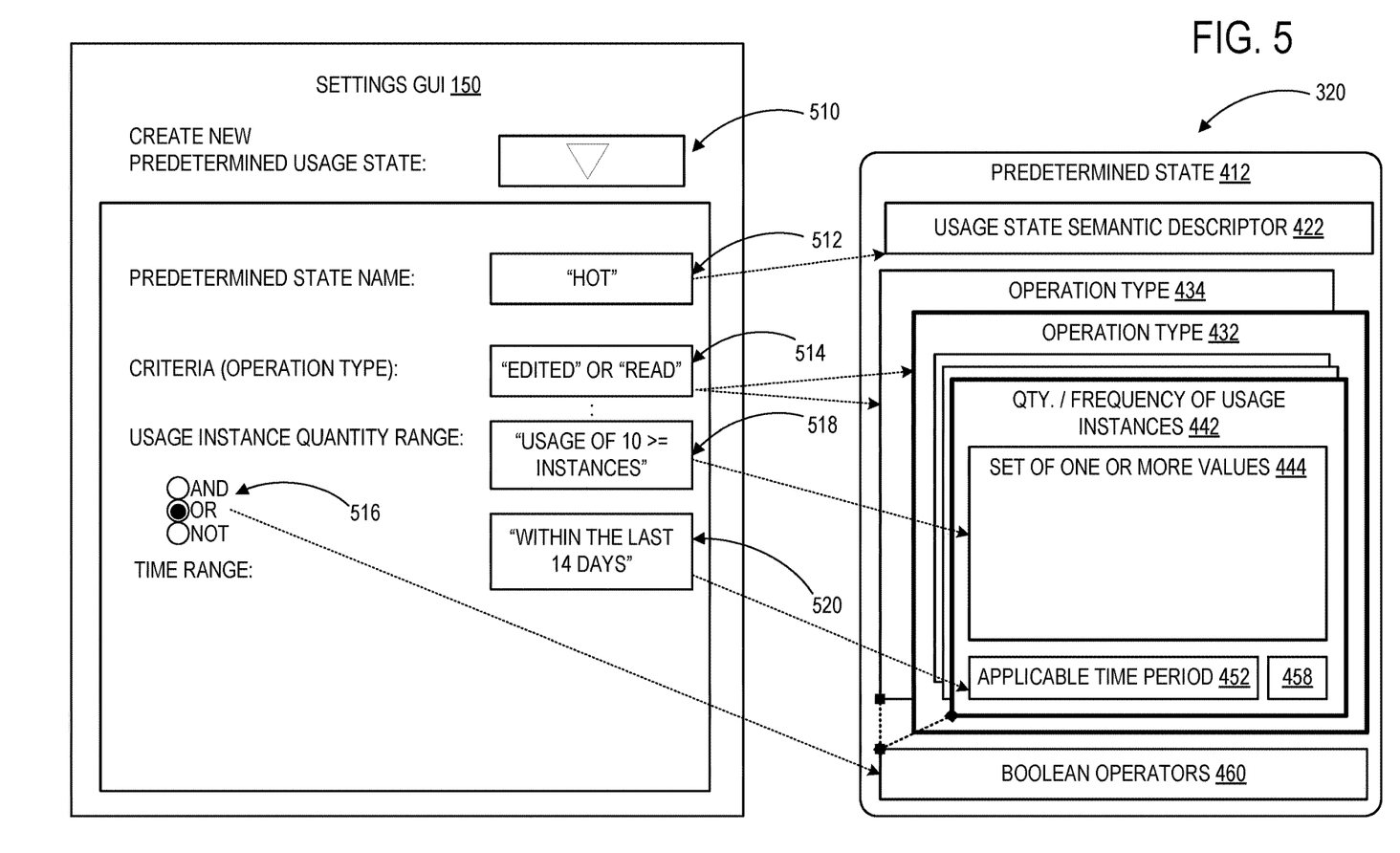
FIG. 5 shows a schematic view of a settings graphical user interface for defining usage state definitions.

FIG. 5 shows an example of settings GUI 150 that enables a user to define aspects of usage state definitions 320. A user interface, such as settings GUI 150 refers to a software component that may be used by users to set values within file usage recorder program 116. FIG. 5 depicts settings GUI 150 as including one or more graphical indicators that represent tools having respective data fields by which a user may define criteria for a usage state. As previously described with reference to FIG. 4, each of the plurality of the predetermined usage states may represent, among other values, a respective range of a frequency or quantity of usage instances for each of a plurality of files.

As depicted in FIG. 5, the settings GUI 150 includes one or more graphical indicators designed to correspond with predetermined states, argument values, such as "state name," "operation type," and "user-specified range." For example, the tool "create new predetermined usage state" 510 enables a user to create a new predetermined usage state that is used by the classifier. Other graphical indicators representing tools and their respective data fields may populate within the user interface of settings GUI 150, to enable a user to enter or select features of the usage state definitions. For example, the tool "predetermined state name" 512, depicted here, may include an alphanumeric name entered by a user to be used as a key to identify a name of a new predetermined usage state. The value entered via tool 512 may be used to set semantic descriptor 422 for predetermined usage state 412, as an example.

FIG. 5 depicts GUI 150 including a tool "criteria (operation type)" 514, which may enable a user to define one or more operation types that are associated with the predetermined usage state. In this way, a user may assign a value to the "operation type" argument. In the example depicted in FIG. 5, a combination of two operation types (e.g., edited and read) is entered, and then assigned a Boolean operator "OR" using a Boolean operator tool 516. Among other criteria, a tool 518 titled "usage instance quantity range" may include a graphical indicator for entering or selecting a numerical value representing a range of usage instances. The value entered is used to set a value for the argument for a range (e.g., 444) within predetermined state 412. GUI 150 includes a time range tool 520 that enables a user to define applicable time period 452. It will be understood that GUI 150 may include any suitable set of tools to enable a user to define any of the features of usage state definitions 320.

Figure 6:
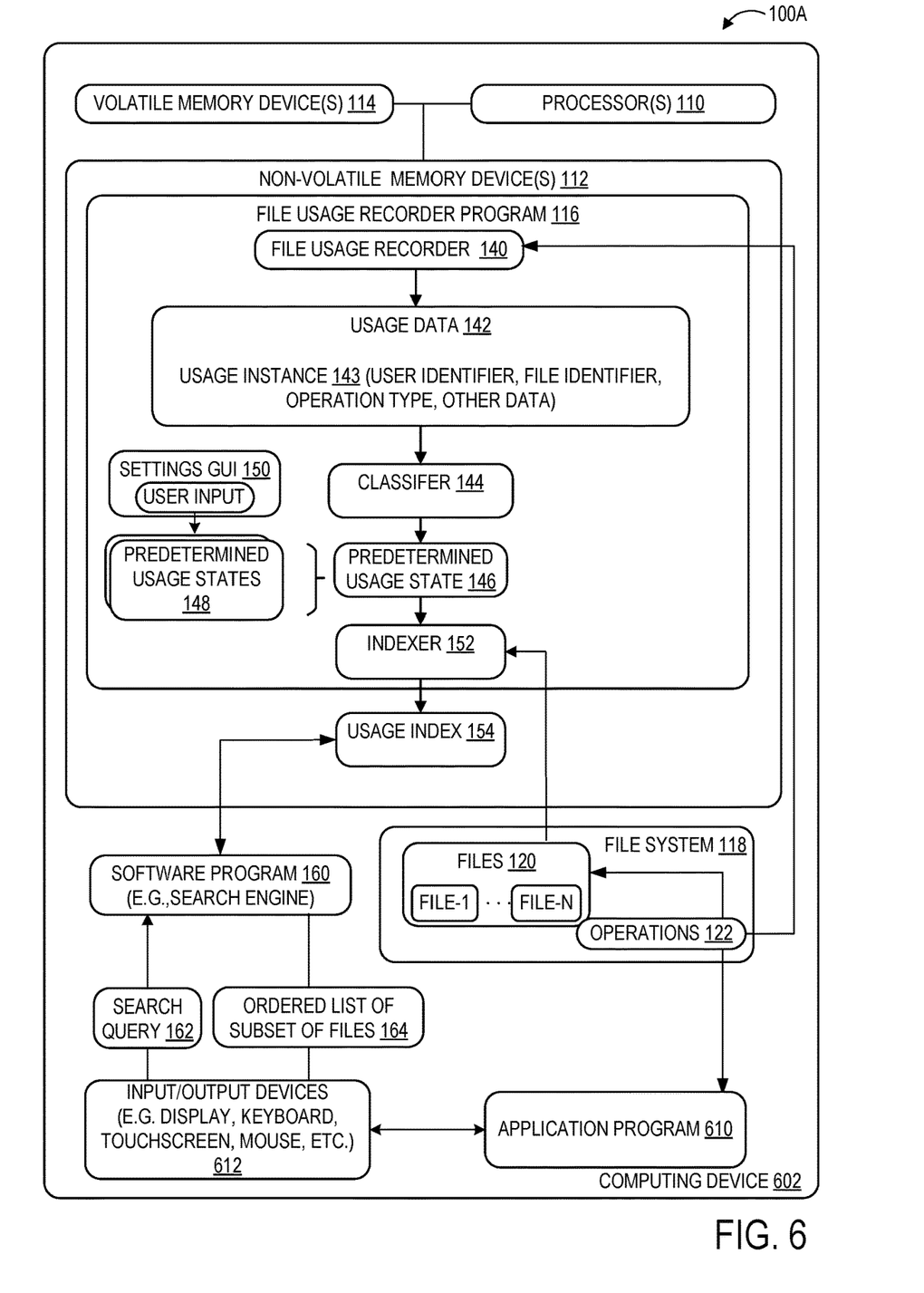
FIG. 6 shows a schematic view of a second example configuration of a system for executing a file usage recorder program.

FIG. 6 shows a schematic view of a second example configuration of system 100 (depicted as system 100A in FIG. 6) for executing file usage recorder program 116. In this example, system 100A includes a computing device 602 in place of computing system 102 of one or more computing devices. Accordingly, system 100A of FIG. 6 depicts an example in which file usage recorder program 116 may be utilized with respect to an individual computing device to provide local indexing of files with respect to predetermined usage states. The one or more processors 110 of computing device 602 execute an application program (e.g., a word processing application) 610 by which operations 122 are performed by a user with respect to files 120 (e.g., word processing documents) stored within file system 118. A user may control and/or interact with application program 610 via one or more input/output devices 612 of computing device 602. A user may also control and/or interact with software program 160 via input/output devices 612 to initiate a search. In at least some examples, software program 160 may form part of application program 610.

Figure 7:
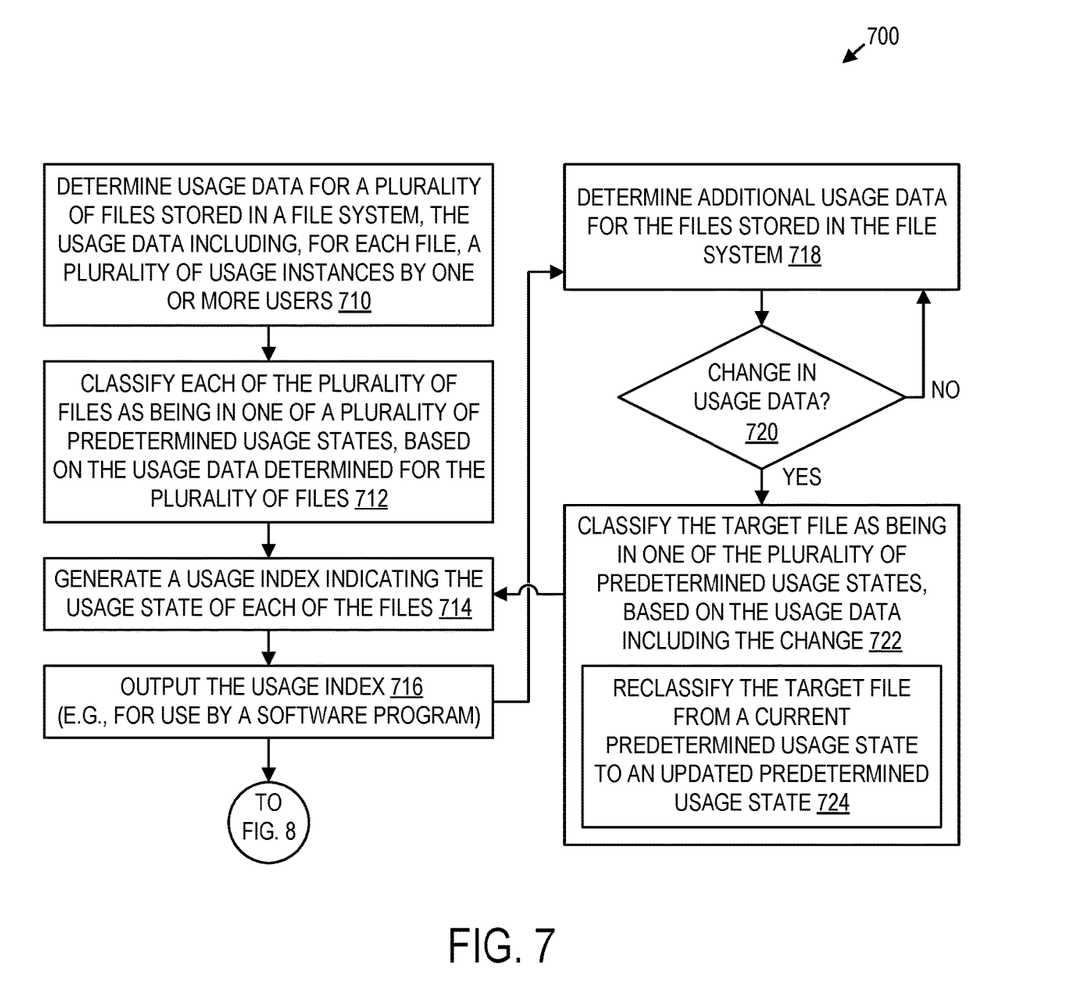
FIG. 7 shows a flowchart illustrating an example method for generating a usage index for use by a software application.

FIG. 7 shows a flowchart illustrating an example method 700 for generating a usage index for use by a software application. Method 700 may be performed by a computing device or a computing system of one or more computing devices, such as example computing device 602 of FIG. 6 or computing system 102 of FIG. 1. In an example, one or more processors of a computing device or computing system may execute file usage recorder program 116 to perform method 700.

At 710, the method includes determining usage data for each of a plurality of files stored in a file system. The usage data includes one or more usage instances by one or more users for each file of the plurality of files. In an example, each usage instance of the plurality of usage instances identifies a respective user, a corresponding file, and an associated operation type selected from a plurality of predetermined operation types. Examples of associated operation types include reading the corresponding file, writing to the corresponding file, editing the corresponding file, deleting the corresponding file, copying the corresponding file, creating the corresponding file, sharing the corresponding file, or presenting the corresponding file. In an example, an individual user may interact with a particular file of the file system as captured by a plurality of usage instances for the file, such as by creating the file or editing the file as examples of predetermined operation types. Other users may also interact with this particular file, such as by editing the file or reading the file. Accordingly, the usage data may include a plurality of usage instances by one or more users for each file of the plurality of files.

At 712, the method includes classifying each of the plurality of files as being in one of a plurality of predetermined usage states, based on the usage data determined for the plurality of files. The predetermined usage states may, for example, indicate a frequency and/or a quantity of usage instances of the plurality of usage instances by the one or more users. In this example, each of the plurality of predefined usage states may represent a respective range of the frequency or the quantity of usage instances of a plurality of ranges for each file of the plurality of files. These ranges may be predetermined or dynamically determined (e.g., by the file usage recorder program) or user specified. It will be understood that in at least some examples a file may be classified into two or more predetermined usage states, such as where a set of predetermined usage states are defined in a manner in which two or more of the states are non-mutually exclusive of each other (e.g., where overlapping criteria are used to define the states). However, in other examples, a set of predetermined usage states may be defined in a mutually exclusive manner so that a file can be classified as being within at most an individual predetermined usage state.

In a first example, each file is classified as being in a usage state at 712 based on the usage data determined for that file without regard to the usage data determined for other files of the plurality of files. In a second example, each file is classified based on the usage data determined for that file and further based on the usage data determined for some or all of the other files of the plurality of files. In this second example, a quantity and/or range of each usage state may be programmatically defined (e.g., by the file usage recorder program) based on the usage data determined for the plurality of files. For example, the entire range for the plurality of files may be determined and divided into two or more respective ranges that collectively cover the entire range. As an illustrative example, files interacted with by users that represent the top 5% of most read, edited, or written to files may be classified as belonging to a first usage state and the remaining 95% of files may be classified as belonging to a second usage state. As another illustrative example, standard deviation may be used to define boundaries of usage states to distinguish files that are associated with orders of magnitude more interactions from the remaining files of the file system.

At 714, the method includes generating a usage index indicating, for each file of the plurality of files, the predetermined usage state in which the file was classified. At 716, the method includes outputting the usage index for use by a software program. The software program that uses the usage index may include the file usage recorder program that performs method 700 or another software program (e.g., a search engine). In an example, the usage index may be output by storing the usage index in a data storage device that is accessible to the software program that is configured to use the usage index. In another example, the usage index may be output by sending or otherwise providing the usage index to the software program that is configured to use the usage index, such as via an API.

Figure 8:
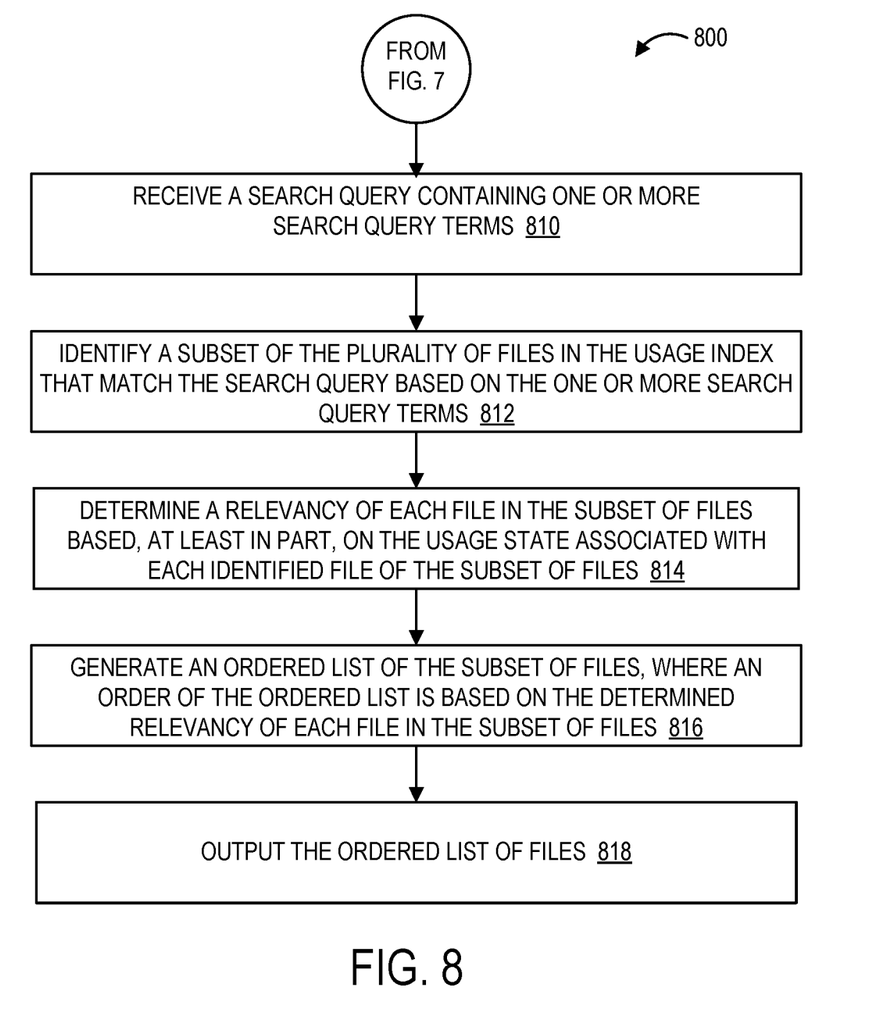
FIG. 8 shows a flowchart illustrating an example method for using the usage index generated by the method of FIG. 7.

Following output of the usage index at 716, method 800 of FIG. 8 may be performed using the usage index. Additionally, method 700 may proceed from operation 716 to operation 718 whereby additional usage data may be determined for one or more files stored in the file system. At 720, the method may include determining whether a change has occurred in the usage data for a target file of the plurality of files of the file system. A change in the usage data may be determined by comparing the usage data determined at 710 to the additional usage data determined at 718. A change in the usage data for a target file may occur in a number of ways. In a first example, a change in the usage data for a target file that was previously classified at 712 may be due to interaction with the target file by one or more users as captured by usage data for the target file. In a second example, a change in the usage data for a target file may result from creation of a new file or other operation type with respect to a file that was not previously classified at 712. At 720, if a change in the usage data did not occur for the target file, the method may return to 718 where additional usage data may be determined for one or more files of the file system to provide periodic or continuous monitoring for changes to the usage data.

At 720, if a change in the usage data has occurred for the target file, the method may proceed to operation 722 in which the target file is classified as being in one of the plurality of predetermined usage states, based on the change in the usage data, including the additional usage data determined at 718 for the target file in combination with the usage data previously determined at 710 for the target file if any). In at least some examples, classifying the target file at 722 may include reclassifying the target file at 724 from a current predetermined usage state to an updated predetermined usage state. However, reclassification at 724 is not performed in cases where the additional usage data for the target file does not cause the predetermined usage state for the target file to change. Furthermore, if the target file was not previously classified at 712, the target file may be classified at 722 as previously described with reference to operation 712 based on the additional usage data determined at 718 for the target file. From operations 722 and/or 724, the method may proceed to generating a usage index (e.g., an updated usage index) at 714 indicating the usage state of each of the files, including the classified or reclassified target file. In some examples, the usage index generated at 714 following reclassification of one or more target files takes the form of an updated usage index. From operation 714, the usage index (e.g., an updated usage index) may be output at 716. Thus, following classifying at 722 or reclassifying at 724, method 800 of FIG. 8 may be performed using the updated usage index with the updated usage state. However, in examples where the target file is not reclassified at 724, an updated usage index may not be generated at 714 or output at 716.

FIG. 8 shows a flowchart illustrating an example method 800 for using the usage index generated by method 700 of FIG. 7. Method 800 may be performed by a computing device or a computing system of one or more computing devices, such as example computing device 602 of FIG. 6 or computing system 102 of FIG. 1. In an example, one or more processors of a computing device or computing system may execute software program 160 to perform method 800.

Figure 9:
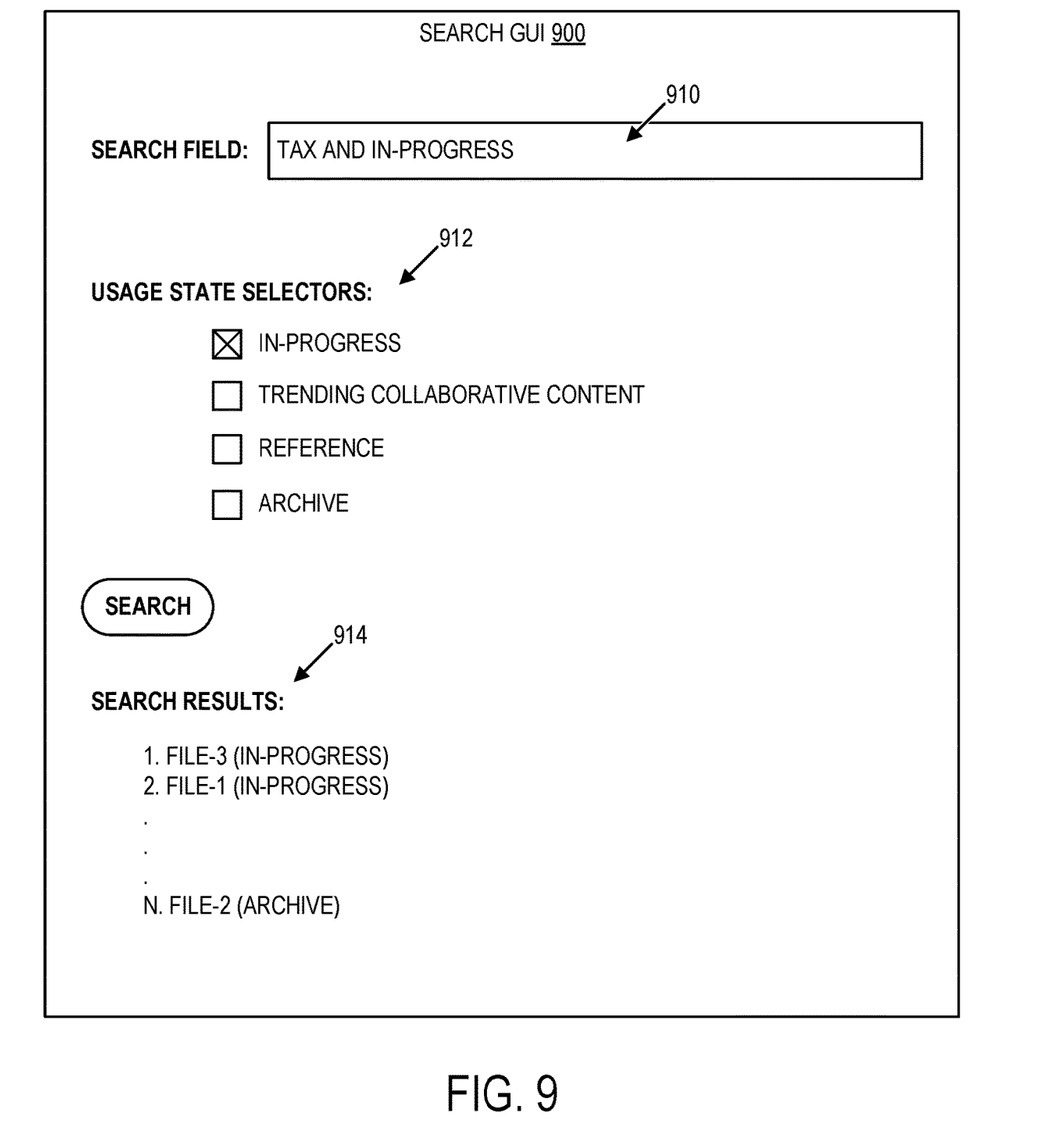
FIG. 9 shows a schematic view of a search graphical user interface.

At 810, the method includes receiving a search query containing one or more search query terms. The search query, including the one or more search query terms, may be provided by a user via a user interface, such as a search GUI or other suitable search interface (e.g., a natural language interface) of an application program, a web browser, an operating system, or a file system. An example of a search GUI 900 is depicted in FIG. 9 in which one or more search query terms (e.g., "TAX") may be provided via search field 910. The search query terms may include or identify one or more keywords, predetermined usage states, user identifiers, time frames, and/or predetermined operation types, among other variables that can be used to filter files of a file system to identify a particular subset of files. For example, a user may search for "reference material relating to . . . " or "recently authored and popular content for . . . ". In other examples, a user may search for "documents changed during July of 2018 for . . . " or "documents actively worked on now for . . . ". In one example implementation, the search query may be initiated by a user via a client computing device that is remote from the computing device or computing system that executes the software program. In another example implementation, the search query may be initiated by a user via the same computing device or computing system that executes file usage recorder program 116.

Within the example of FIG. 9, the search query terms within search field 910 includes "IN-PROGRESS", which refers to first predetermined usage state 330 of FIG. 3. In at least some examples, a syntax may be used to distinguish predetermined usage states from other search query terms within a search field. For example, the "IN-PROGRESS" search query term of FIG. 9 may be annotated (e.g., preceded or appended) by a user adding a syntax identifier (e.g., [CS] for classified state) that informs the search engine or other program component that the search query term is directed to a predetermined usage state.

In at least some examples, users may select a particular predetermined usage state to include in a search query using a curated set of usage state selectors that identify usage state semantic descriptors (e.g., 422) and/or usage state graphical descriptors (e.g., 424) that are included in the usage state definitions. For example, FIG. 9 depicts search GUI 900 as including curated usage state selectors 912 that correspond to the four example usage states of FIG. 3. Upon selection of one or more usage state selectors 912, the corresponding usage states identified by those selectors define search query terms that form part of the search query in combination with any search query terms provided via the search field.

At 812, the method includes identifying a subset of files of the plurality of files in the usage index that match the search query based on the one or more search query terms. In at least some examples, the usage index may form part of a search index that includes a variety of properties of files of a file system beyond predetermined usage states or usage instance data identified by the usage index. This search index that includes the usage index may be used to identify files matching a search query.

At 814, the method includes determining a relevancy of each file of the subset of files based, at least in part, on the predetermined usage state associated with each file of the subset of files. In examples in which the search query terms include or are submitted with a predetermined usage state, identifying files at 812 includes identifying files based at least in part on the predetermined usage state of the search query terms and/or accompanying predetermined usage states selected by the user. For example, if the terms "reference material" are included in the search query terms, files with a predetermined usage state of "reference" will have a higher relevancy than files with a different usage state. In another example, if the terms "actively worked on" are included in the search query terms, files with recently edited content, such as files with a predetermined usage state of "in-progress" or "trending collaborative content" will be have a higher relevancy than files with content that has not been edited recently, such as files having a predetermined usage state of "reference" or "archive".

Predetermined usage states may be arranged within a relevancy hierarchy by a search engine. In an example, files classified as being in a particular predetermined usage state may be determined as having a higher relevancy than files classified as being in a different predetermined usage state or files that have not been classified into any predetermined usage state.

At 816, the method includes generating an ordered list of the subset of files in which an order of the subset of files in the ordered list is based on the relevancy determined for each file. In an example, the ordered list may place files having the highest relevancy at the top of the list, with files listed in order of descending relevancy. Referring again to FIG. 9, example search results 914 are depicted as including an ordered list of files in which files "FILE-3" and "FILE-1" that are classified as being in the "IN-PROGRESS" predetermined usage state are ranked higher in search results 914 as compared to file "FILE-2" that is classified as being in the "ARCHIVE" predetermined usage state due to the "IN-PROGRESS" search query term forming part of the search query. However, it will be understood that the ordered list may be re-ordered, for example, responsive to user input so that files are listed in order of ascending relevancy. Furthermore, files may be ordered within the ordered list based on their predetermined usage state without regard to relevancy so that files of a particular predetermined usage state are ordered or otherwise grouped together within search results.

At 818, the method includes outputting the ordered list of the subset of files. In an example, the ordered list of the subset of files that is output includes an indication of the predetermined usage state for each of the files in the ordered list of the subset of files. Within the ordered list, predetermined usage states of files may be indicated by a usage state semantic descriptor (e.g., 422) or a usage state graphical descriptor (e.g., 424), such as an icon. For example, in FIG. 9, the semantic descriptor "IN-PROGRESS" accompanies "FILE-3". The ordered list may be output via a graphical user interface displayed by a display device of a computing device. In another example, the ordered list may be output via an audio speaker as computer generated speech.

Referring again to FIGS. 1 and 6, systems 100 and 100A are depicted in simplified form. A computing system or computing device may take the form of one or more personal computers, server computers, tablet computers, network computing devices, gaming devices, mobile computing devices, mobile communication devices (e.g., smart phone), and/or other computing devices.

Each of the one or more processors 110 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile memory devices 112 includes one or more physical devices configured to hold instructions executable by the logic processors to implement the methods and processes described herein. Non-volatile memory devices may include physical devices that are removable and/or built-in. Non-volatile memory devices may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile memory devices may include nonvolatile, dynamic, static, read/write, read-only, sequential-access, location-addressable, file-addressable, and/or content-addressable devices. It will be appreciated that non-volatile memory devices are configured to hold instructions even when power is cut to the non-volatile memory devices.

Volatile memory devices 114 may include physical devices that include random access memory. Volatile memory devices are typically utilized by processors to temporarily store information during processing of software instructions. It will be appreciated that volatile memory devices typically do not continue to store instructions when power is cut to the volatile memory devices.

Aspects of the one or more processors 110, non-volatile memory devices 112, and volatile memory devices 114 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a computing system or computing device typically implemented in software by a processor to perform a particular function using portions of volatile memory, which function involves transformative processing that specially configures the processor to perform the function. Thus, a module, program, or engine may be instantiated via one or more processor devices executing instructions held by one or more non-volatile memory devices, using portions of one or more volatile memory devices. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, a display subsystem of input/output devices 612 may be used to present a visual representation of data held by non-volatile memory devices 112 and/or volatile memory devices 114. The visual representation may take the form of a graphical user interface (GUI). As the herein described methods and processes change the data held by the non-volatile storage device, and thus transform the state of the non-volatile storage device, the state of the display subsystem may likewise be transformed to visually represent changes in the underlying data. The display subsystem may include one or more display devices utilizing virtually any type of technology. Such display devices may be combined with processors and memory devices in a shared enclosure, or such display devices may be peripheral display devices.

Input/output devices 612 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

Input/output devices 612 may include a communication subsystem configured to communicatively couple various computing devices described herein with each other, and with other devices. The communication subsystem may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 102 or computing device 602 to send and/or receive messages to and/or from other devices via a communications network such as the Internet.

In an example of the present disclosure, a computing system comprises: one or more processors; and one or more memory devices having a file usage recorder program stored thereon executable by the one or more processors to: determine usage data for a plurality of files stored in a file system, the usage data including, for each file, a plurality of usage instances by one or more users; classify each file of the plurality of files as being in one of a plurality of predetermined usage states, based on the usage data determined for the plurality of files; generate a usage index indicating, for each file of the plurality of files, the predetermined usage state in which the file was classified; and output the usage index for use by a software program. In this example or another example, each usage instance of the plurality of usage instances identifies a respective user, a corresponding file, and an associated operation type selected from a plurality of predetermined operation types. In this example or another example, the associated operation type includes reading the corresponding file, writing to the corresponding file, editing the corresponding file, deleting the corresponding file, copying the corresponding file, creating the corresponding file, sharing the corresponding file, or presenting the corresponding file. In this example or another example, the predetermined usage states indicate a frequency and/or a quantity of usage instances of the plurality of usage instances by the one or more users. In this example or another example, each of the plurality of predefined usage states represents a respective range of the frequency or the quantity of usage instances for each file of the plurality of files. In this example or another example, the ranges are predetermined or dynamically determined or user specified. In this example or another example, the file usage recorder program is further executable by the one or more processors to: determine that a change has occurred in the usage data for a target file of the plurality of files; and reclassify the target file from a current predetermined usage state to an updated predetermined usage state. In this example or another example, the one or more memory devices further includes instructions stored thereon executable by the one or more processors to: receive a search query containing one or more search query terms; identify a subset of files of the plurality of files in the usage index that match the search query based on the one or more search query terms; determine a relevancy of each file of the subset of files based, at least in part, on the predetermined usage state associated with each file of the subset of files; generate an ordered list of the subset of files, wherein an order of the subset of files in the ordered list is based on the relevancy determined for each file in the ordered list; and output the ordered list of the subset of files. In this example or another example, the ordered list of the subset of files that is output includes an indication of the predetermined usage state for each of the files in the ordered list of the subset of files.

In another example of the present disclosure, a computing method for recording file usage, comprises: determining usage data for a plurality of files stored in a file system, the usage data including, for each file, a plurality of usage instances by one or more users; classifying each of the plurality of files as being in one of a plurality of predetermined usage states, based on the determined usage data; generating a usage index indicating the usage state of each of the plurality of files; and outputting the usage index for use by a software program. In this example or another example, each usage instance includes a respective user, a corresponding file, and an associated operation type selected from a plurality of predetermined operation types. In this example or another example, the predetermined usage states indicate the frequency and/or quantity of usage instances of the plurality of usage instances by one or more users. In this example or another example, each of the plurality of the usage states represents a respective range of frequency or quantity of usage instances for each of the plurality of files. In this example or another example, the ranges are predetermined or dynamically determined or user specified. In this example or another example, the associated operation type includes reading a file, writing to a file, editing a file, deleting a file, copying a file, creating a file, sharing a file, or presenting a file. In this example or another example, the method further comprises: determining that a change has occurred in usage data for a target file of the plurality of files; and reclassifying the usage state of the target file, from a current predetermined usage state to an updated predetermined usage state. In this example or another example, the method further comprises: receiving a search query containing one or more search query terms; identifying a subset of the plurality of files in the usage index that match the search query based on the search query terms; determining a relevancy of each file of the subset of files based at least in part on the usage state associated with each identified file; generating an ordered list of the subset of files, wherein an order of the ordered list is based on the determined relevancy of each file in the ordered list of the subset of files; and outputting the ordered list of the subset of files. In this example or another example, the output ordered list of the subset of files includes the predetermined usage state for each of the plurality of files.

In another example of the present disclosure, a computing system comprises: one or more processors; and one or more memory devices having instructions stored thereon executable by the one or more processors to: store a usage index including a plurality of files and a usage state associated with each file; receive a search query containing one or more search query terms; identify a subset of the plurality of files in the usage index that match the search query based on the one or more search query terms; determine a relevancy of each file of the subset of files based at least in part on the usage state associated with each identified file; generate an ordered list of the subset of files, wherein an order of the ordered list is based on the determined relevancy of each file in the ordered list of the subset of files; and output the ordered list of the subset of files. In this example or another example, the search query terms include usage state terms provided via a user interface, and wherein the subset of files is identified based at least in part on the usage state terms by filtering the subset of files from other files of the usage index.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
one or more processors; and
one or more memory devices having a file usage recorder program stored thereon executable by the one or more processors to:
determine usage data for a plurality of files stored in a file system, the usage data including, for each file, a plurality of usage instances by one or more users;
classify, based on the usage data, each file of the plurality of files as being in one of a plurality of predetermined usage states, the predetermined usage states corresponding to one or more terms indicating that a file at least one of:
is in development;
has been recent edited, written to, or read;
has not been recently edited or written to, but has been recently read; or
has not been recent edited, written to, or read;
generate a usage index indicating, for each file of the plurality of files, the predetermined usage state in which the file was classified; and
output the usage index for use by a software program.

2. The computing system of claim 1, wherein each usage instance of the plurality of usage instances identifies a respective user, a corresponding file, and an associated operation type selected from a plurality of predetermined operation types.

3. The computing system of claim 2, wherein the associated operation type includes reading the corresponding file, writing to the corresponding file, editing the corresponding file, deleting the corresponding file, copying the corresponding file, creating the corresponding file, sharing the corresponding file, or presenting the corresponding file.

4. The computing system of claim 1, wherein the predetermined usage states indicate a frequency and/or a quantity of usage instances of the plurality of usage instances by the one or more users.

5. The computing system of claim 4, wherein each of the plurality of predefined usage states represents a respective range of the frequency or the quantity of usage instances for each file of the plurality of files.

6. The computing system of claim 5, wherein the ranges are predetermined or dynamically determined or user specified.

7. The computing system of claim 1, wherein the file usage recorder program is further executable by the one or more processors to:
determine that a change has occurred in the usage data for a target file of the plurality of files; and
reclassify the target file from a current predetermined usage state to an updated predetermined usage state.

8. The computing system of claim 1, wherein the one or more memory devices further includes instructions stored thereon executable by the one or more processors to:
receive a search query containing one or more search query terms;
identify a subset of files of the plurality of files in the usage index that match the search query based on the one or more search query terms;
determine a relevancy of each file of the subset of files based, at least in part, on the predetermined usage state associated with each file of the subset of files;
generate an ordered list of the subset of files, wherein an order of the subset of files in the ordered list is based on the relevancy determined for each file in the ordered list; and
output the ordered list of the subset of files.

9. The computing system of claim 8, wherein the ordered list of the subset of files that is output includes an indication of the predetermined usage state for each of the files in the ordered list of the subset of files.

10. A computing method for recording file usage, the method comprising:
determining usage data for a plurality of files stored in a file system, the usage data including, for each file, a plurality of usage instances by one or more users;
classifying, based on the usage data, each of the plurality of files as being in one of a plurality of predetermined usage states, the predetermined usage states corresponding to one or more terms indicating that a file at least one of:
is in development;
has been recent edited, written to, or read;
has not been recently edited or written to, but has been recently read; or
has not been recent edited, written to, or read;
generating a usage index indicating the usage state of each of the plurality of files; and
outputting the usage index for use by a software program.

11. The computing method of claim 10, wherein each usage instance includes a respective user, a corresponding file, and an associated operation type selected from a plurality of predetermined operation types.

12. The computing method of claim 10, wherein the predetermined usage states indicate the frequency and/or quantity of usage instances of the plurality of usage instances by one or more users.

13. The computing method of claim 12, wherein each of the plurality of the usage states represents a respective range of frequency or quantity of usage instances for each of the plurality of files.

14. The computing method of claim 13, wherein the ranges are predetermined or dynamically determined or user specified.

15. The computing method of claim 11, wherein the associated operation type includes reading a file, writing to a file, editing a file, deleting a file, copying a file, creating a file, sharing a file, or presenting a file.

16. The computing method of claim 10, further comprising:
determining that a change has occurred in usage data for a target file of the plurality of files; and reclassifying the usage state of the target file, from a current predetermined usage state to an updated predetermined usage state.

17. The computing method of claim 10 further comprising:
receiving a search query containing one or more search query terms;
identifying a subset of the plurality of files in the usage index that match the search query based on the search query terms;
determining a relevancy of each file of the subset of files based at least in part on the usage state associated with each identified file;
generating an ordered list of the subset of files, wherein an order of the ordered list is based on the determined relevancy of each file in the ordered list of the subset of files; and
outputting the ordered list of the subset of files.

18. The computing method of claim 17, wherein the output ordered list of the subset of files includes the predetermined usage state for each of the plurality of files.

19. A computing system comprising:
one or more processors; and
one or more memory devices having instructions stored thereon executable by the one or more processors to:
store a usage index including a plurality of files and a usage state associated with each file;
receive a search query containing one or more search query terms;
identify a subset of the plurality of files in the usage index that match the search query based on the one or more search query terms;
determine a relevancy of each file of the subset of files based at least in part on the usage state associated with each identified file, wherein the usage state corresponds to one or more terms indicating that a file at least one of:
is in development;
has been recent edited, written to, or read;
has not been recently edited or written to, but has been recently read; or
has not been recent edited, written to, or read;
generate an ordered list of the subset of files, wherein an order of the ordered list is based on the determined relevancy of each file in the ordered list of the subset of files; and
output the ordered list of the subset of files.

20. The computing system of claim 19, wherein the search query terms include usage state terms provided via a user interface, and wherein the subset of files is identified based at least in part on the usage state terms by filtering the subset of files from other files of the usage index.

* * * * *